3,406,516
SPEED CONTROL DEVICES FOR GAS TURBINE ENGINES

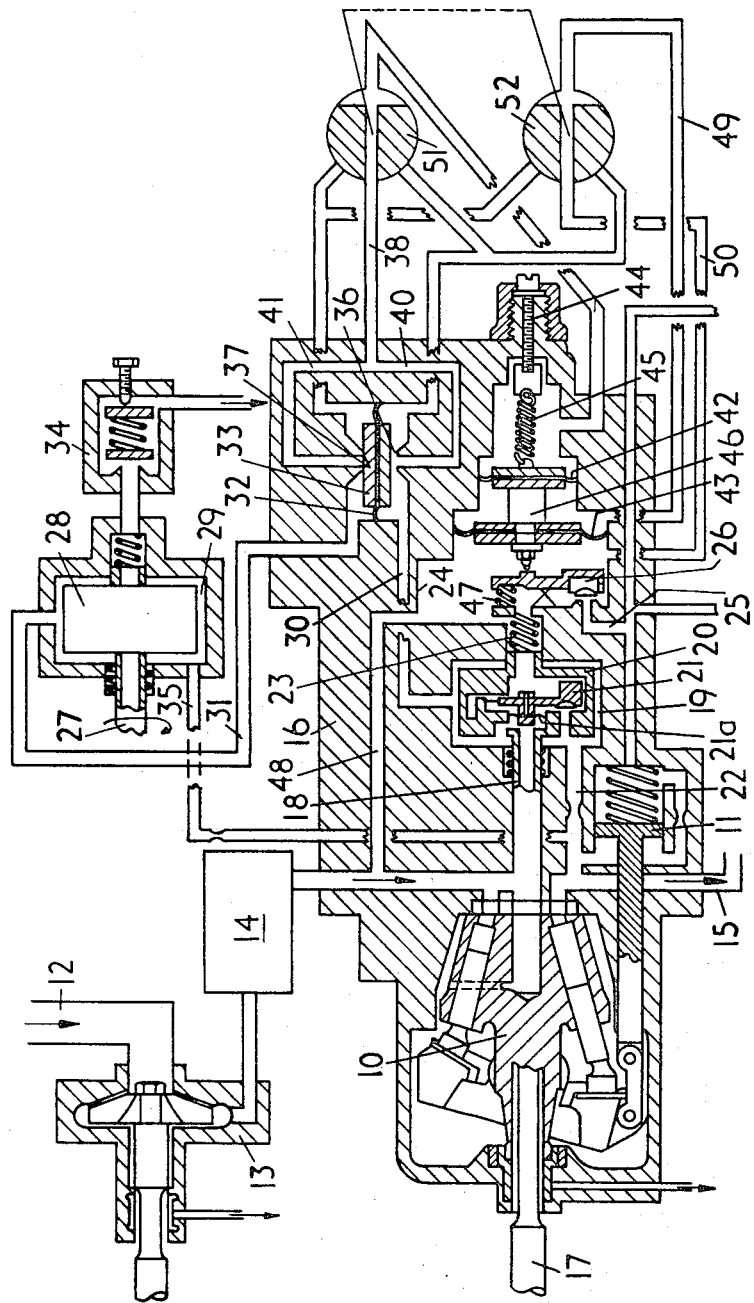

Thomas Charles Yates, Solihull, England, assignor to Joseph Lucas (Industries) Limited, Birmingham, England, a British company
Filed Mar. 20, 1967, Ser. No. 624,438
Claims priority, application Great Britain, Mar. 24, 1966, 13,117/66
5 Claims. (Cl. 60—39.28)

ABSTRACT OF THE DISCLOSURE

A fuel control device for a gas turbine engine having two independently rotatable shafts, a speed responsive device driven by each shaft and arranged to provide fluid pressure signals to valve means which applies the higher of the two signals to a valve closure member which controls the output of a pump through a servo device.

---

This invention relates to fuel control devices for use with the kind having two independently rotatable concentric shafts, normally, though not always carrying respective compressors and turbines.

The object of this invention is to provide a device for use in an engine of the kind specified, in a convenient form.

In accordance with the present invention, a device for use with an engine of the kind specified comprises a pair of speed responsive devices associated with respective engine shafts, said producing fluid pressure signals which are of substantially the same order when the required speed ratio between the shafts obtains, and valve means to which the two signal pressures are applied said valve means being arranged to apply to apparatus for controlling the supply of fuel, the higher of the two signal pressures.

The invention will now be described with reference to the accompanying diagrammatic drawing which illustrates part of a fuel system for a gas turbine engine, incorporating the present invention.

In the drawing there is shown an engine driven pump of the swash plate type and indicated generally at 10 of the kind in which the swash plate angle is variable by means of a piston and cylinder type servo device 11. The pump 10 obtains its supply of fuel from a reservoir (not shown) connected to a supply line 12, the supply to the pump being pressurised by a boost pump 13 and being filtered by a device indicated generally at 14.

Fuel delivered from the pump 10 is discharged through a passage 15 in a body 16 housing the pump, the passage 15 being, in use, connected to the engine burners. Normally the passage 15 communicates with the burners through an air/fuel ratio control device and a throttle device and possibly also other apparatus, in known manner.

The pump 10 is driven through a shaft 17 from the engine, and this also drives a spindle 18 which carries a rotor 20 disposed within a chamber 19. Within the rotor 20 is a weighted valve closure member 21 to which is connected a diaphragm 21a, the suspension of the valve closure member 21 on the rotor 20 being, within the limits of permitted movement, substantially without resilience so that movement of the valve closure member 21 is dependent substantially wholly upon pressures acting upon the diaphragm 21a, and upon the speed of rotation of the rotor 20. Opening into the chamber 19 is a restricted passage 22 and a passage 30 leads out of it. The passage 22 communicates with the outlet passage 15.

In use, the fuel flowing from the passage 22 to the passage 30 is at a pressure which is dependent upon the opening of the valve closure member 21 which in turn is dependent upon speed of the rotor 20 and upon the pressures at opposite sides of the diaphragm 21a. The fuel flowing through the rotor 20 is returned to the inlet of the pump 10 through a passage 23, a chamber 24 and a passage 48.

The type of engine to which the present invention is applied is that in which there are two concentric engine shafts carrying respective compressors and turbines, these shafts having respective speed responsive devices. One of the shafts of the engine is arranged in this case to drive the pump 10 through the shaft 17, and the speed responsive device for this engine shaft is the rotor 20 and valve closure member 21. The other engine shaft drives a further shaft 27 which in turn drives a further speed responsive device indicated generally at 28, this being of substantially the same form as the device shown having the rotor 20 and valve closure member 21 previously described. The high pressure flow from the pump outlet passage 15 enters through the restricted passage 35. Both these speed responsive devices produce fluid pressure signals from their respective surrounding chambers 19 and 29, these signal pressures being exerted through respective passages 30 and 31 at opposite sides of a diaphragm 32, carrying a closure member 33 as illustrated.

It is however a fact that with this type of apparatus, the engine shafts normally rotate at different speeds, so that unless otherwise modified, the signal pressure in the passage 30 would differ from that in the passage 31 by a substantial amount. In order that the signal pressures shall be substantially of the same order, there is provided a spring loaded and adjustable valve 34 which serves to restrict flow from the interior of the chamber 29, thus causing the signal pressure in the passage 31 to be higher than would otherwise be the case.

However, normally there will be some relatively small difference between the pressures in the passages 30, 31 and the diaphragm 32 and closure member 33 will normally be biased towards one or other of the two seatings 36, 37, controlling the flow of fuel from the passages 30 and 31 respectively to the passage 38 leading to one end of the chamber 24 in the body 16. The passage 38 communicates with opposite sides of the diaphragm 32 through a pair of passages 40 and 41 respectively.

The chamber 24 in the body 16 is divided into three portions by means of two diaphragms 42, 43, that end into which the passage 38 opens being defined by the diaphragm 42, the positions of which are controlled by a spring acting between a tension spring 45 and a member 46 to which both diaphragms 42, 43 are connected. The spring 45 is adjustable by means of a screw 44 and the opposite end of the member 46 can engage with a valve closure member 26 to cause it to move against the action of a spring 47, to control the flow of fuel through a passage 25 which communicates with one end of the servo device 11. This device 11 is arranged to decrease the pump stroke and therefore the supply of fuel to the engine as the valve closure member 26 opens, which it will do as the pressure in the passage 38 increases, as a result of speed increase of the engine. Thus the signal pressure which is applied to the side of the diaphragm 42 through the passage 38 to act against the spring 45 is related to the higher of the two speed signals from the respective engine shafts, and this is used to control the flow of fuel to the engine.

The space between the diaphragms 42, 43 is subjected to the pressure at the pump inlet, through the passage 48 there being for this purpose a loop passage 49, 50 affording, as illustrated, communication between opposite sides of the larger diaphragm 43 so that only the diaphragm 42 has differential pressures acting upon it.

In the passage 38 and also in the loop passage 49, 50 there are respective valves 51, 52 which are arranged to be manually actuated in unison, and the puropse of these is described in the Complete Specification of our copending British Patent Application No. 13,118/66. They are provided to enable a test of the correct operation of the two speed responsive devices to be carried out. In the application referred to, the two valves 51, 52 can be actuated to apply the two pressures normally acting on opposite sides of the smaller diaphragm 42 to opposite sides of a diaphragm 43. This arrangement enables the valve closure member 26 to be moved by the member 46 at a substantially lower speed than is possible when the pressures are applied at opposite sides of the smaller diaphragm 42.

Having thus described my invention what I claim as new and desire to secure by Letters Patent is:

1. A device for use with a gas turbine engine having two independently rotatable concentric shafts, comprising a pair of speed responsive devices associated with respective engine shafts, said devices producing fluid pressure signals which are of substantially the same order when the required speed ratio between the shafts obtains, and valve means to which the two signal pressures are applied, said valve means being arranged to apply to apparatus for controlling the supply of fuel, the higher of the two signal pressures.

2. A device as claimed in claim 1 in which the means for obtaining fluid pressure signals from the speed responsive devices respectively comprise valves actuated by said speed responsive devices repsectively to control flow of fuel to respective passages.

3. A device as claimed in claim 1 in which one of the speed responsive devices has an associated pressurising valve which ensures that the pressure signals from the two speed responsive devices are in the same order.

4. A device as claimed in claim 1 in which the valve means for applying the higher signal pressure to apparatus for controlling the supply of fuel comprises a diaphragm to opposite sides of which the signals are applied respectively, the diaphragm carrying a member which opens a passage which can communicate with one side of said diaphragm, whilst closing another passage which can communicate with the other side of the diaphragm.

5. A device as claimed in claim 4 in which said passages which can communicate with the opposite sides of the diaphragm, whilst closing another passage which can ends, with a chamber one side of which is bounded by a further diaphragm which carries a member acting upon a valve which in turn controls one of the pressures obtaining at opposite sides of a servo mechanism for controlling a pump in the system for supplying fuel to the associated engine.

References Cited

UNITED STATES PATENTS

| | | | |
|---|---|---|---|
| 3,040,529 | 6/1962 | Hurtle | 60—39.28 |
| 3,152,444 | 10/1964 | Peczkowski et al. | |
| | | | 60—39.28 XR |

JULIUS E. WEST, *Primary Examiner.*